United States Patent [19]

Duenas et al.

[11] Patent Number: 5,564,733

[45] Date of Patent: Oct. 15, 1996

[54] INSTRUMENT PANEL HAVING AN INTEGRATED, SWING-OPEN AIR-BAG COVER

[75] Inventors: Santiago Duenas, Ammerbuch; Stephan Schreiner, Mötzingen; Harald Koppenstein, Remseck; Helmut Wagner, Sindelfingen; Jörg Henkel, Göppingen, all of Germany

[73] Assignee: Mercedes-Benz AG, Stuttgart, Germany

[21] Appl. No.: 544,164

[22] Filed: Oct. 17, 1995

[30] Foreign Application Priority Data

Oct. 24, 1994 [DE] Germany .......................... 44 37 773.8

[51] Int. Cl.⁶ ..................................... B60R 21/20
[52] U.S. Cl. .......................... 280/728.3; 280/732
[58] Field of Search .......................... 280/728.3, 732, 280/728.1; 180/90

[56] References Cited

U.S. PATENT DOCUMENTS

| | | | |
|---|---|---|---|
| 5,172,931 | 12/1992 | Baba et al. | 280/728.3 |
| 5,346,249 | 9/1994 | Hallard et al. | 280/728.3 |
| 5,382,047 | 1/1995 | Gajewski | 280/728.3 |
| 5,431,439 | 7/1995 | Amamori et al. | 280/732 |
| 5,437,470 | 8/1995 | Terai et al. | 280/728.3 |
| 5,445,410 | 8/1995 | Czapp et al. | 280/728.3 |
| 5,456,487 | 10/1995 | Daris et al. | 280/728.3 |

FOREIGN PATENT DOCUMENTS

| | | |
|---|---|---|
| 0370613A1 | 5/1990 | European Pat. Off. . |
| 0582443A1 | 2/1994 | European Pat. Off. . |
| 2045245 | 5/1971 | Germany . |
| 3843686 | 6/1990 | Germany ................ 280/728.3 |
| 3918281A1 | 12/1990 | Germany . |

*Primary Examiner*—Christopher P. Ellis
*Attorney, Agent, or Firm*—Evenson McKeown Edwards & Lenahan, PLLC

[57] ABSTRACT

Motor vehicle instrument panel including a stiffening panel defining an instrument panel shape. The stiffening panel includes an airbag cover section and a hinge connection section which connects the airbag cover section to adjacent stiffening panel sections. A reinforcement mat is connected to a side of the stiffening panel which faces away from a vehicle passenger space bounded by the instrument panel when in an in-use position in a vehicle. The reinforcement mat includes a plurality of openings, and the reinforcement mat and stiffening panel are connected together by pressing of material of the stiffening panel into the openings of the reinforcement mat thereby providing an intimate connection of the reinforcement mat and stiffening panel without requiring additional fastening material.

14 Claims, 1 Drawing Sheet

INSTRUMENT PANEL HAVING AN INTEGRATED, SWING-OPEN AIR-BAG COVER

BACKGROUND AND SUMMARY OF THE INVENTION

The invention relates to an instrument panel having an integrated, swing-open air-bag cover, and a process for producing such an instrument panel.

A passenger air bag in a motor car is arranged in a folded state behind an instrument-panel surface. The instrument panel exhibits a shaped stiffening panel which may be covered over with foam to dampen impact forces in the direction of the occupant and in which there is provided an unfolding opening through which the activated air bag unfolds in the direction of the passenger seat. When the air bag is in the folded state, the unfolding opening is covered over by an air-bag cover which is formed as an integral part of the instrument-panel surface and, for the most part, is separated off from the stiffening panel of the instrument panel by a separating operation and which then is swung open around a remaining connecting section when the airbag unfolds.

European Patent Document EP 0 582 443 A1 discloses a steering wheel with a driver airbag which is covered over by an air-bag cover which is designed as part of the covering of the steering-wheel cup. The covering exhibits peripheral perforations which predetermine the opening line for a swinging-open movement of two cover halves when the air-bag unfolds. The air-bag cover exhibits a reinforcement panel on the inside. In the hinge region of each cover half, a nylon fabric is attached on the reinforcement panel, which fabric is encapsulated or foam-surrounded together with the reinforcement panel and is consequently held on the latter. The problem of the easily producible fastening, not achieved here, of the fabric with cost-effective manufacturing of the air-bag cover does not have the same implications here as in the case of the covering of a passenger air-bag. This is so, since the air-bag receiving means and the air-bag cover in the steering wheel are components which, in terms of material selection and configuration, do not have any decisive influence on the surrounding parts, as is the case with accommodation in the instrument panel, but can be configured individually and designed for loading in accordance with requirements. The fabric strip can thus be fastened with any suitable means.

In European Patent Document EP 0 370 613 B1, a description is given of an air-bag unit for a vehicle steering wheel, in the case of which unit the air-bag cover, as part of the covering of the steering-wheel cup, remains connected on one side to the surrounding surface and is bent open around this side edge by the unfolding air-bag. In order, in this arrangement, to prevent the cover from breaking at this edge due to the loading and then being flung into the interior of the vehicle, the air-bag flap has to be manufactured here, along with the entire surrounding surfaces, from a material which can fulfil the requirements of resistance to fracture and flexural elasticity, as a result of which the entire component becomes expensive.

In the designs of German Patent Documents DE 20 45 245 Al and DE 39 18 281 Al, the air-bag cover adjoins the instrument panel in one piece and likewise exhibits the reinforcement insert thereof on the inside. An additional reinforcement of the hinge region is not provided here, for which reason the instrument panel here likewise has to be designed, in terms of material selection and structure, in accordance with the stressing of the air-bag cover.

In an exemplary embodiment according to German Patent Document DE 43 11 241 C1, the air-bag cover can be fully separated from the instrument panel, but the air-bag cover has to be connected to the instrument panel via a restraining strap, which is to be additionally manufactured and mounted, in order that the air-bag cover is not thrown far into the interior.

An object of the invention comprises attaching an air-bag cover of the generic type on the instrument panel in a secure manner, in order to minimize the manufacturing outlay.

This object is achieved by providing an arrangement wherein the reinforcement is secured on the stiffening panel by a pressing operation in which the material of the stiffening panel is pressed into the openings of the reinforcement.

Being pressed onto the connecting section, the reinforcement, with said connecting section, secures the swing-open air-bag cover on the instrument panel. In this arrangement, an intimate connection is produced by the material of the stiffening panel flowing into the openings of the reinforcement. The secure attachment of the air-bag cover onto the surrounding instrument panel is, in addition, promoted by taking the reinforcement up to the separating line and to both sides thereof, since the reinforcement material prevents further tearing at the ends of the separating line. The reinforcement may consist of sheet metal, flat-woven material or a textile insert according to various preferred embodiments of the invention. A uniform arrangement of the openings, which can be produced by a simple punching operation, also achieves a uniform connection between the stiffening panel in the air-bag cover, and in the surrounding instrument panel, and the reinforcement. The process for manufacturing the instrument panel with this reinforcement is particularly cost-effective if the shape of the stiffening panel as well as the equivalent shape of the reinforcement and, at the same time, also the connection of the two parts are produced in one pressing operation. Alternatively, both the stiffening panel and the reinforcement may be preformed before the pressing operation. Or, either the stiffening panel or the reinforcement may be preformed before the pressing operation, with the other being shaped during the pressing operation. There is no need for any additional fastening material.

This type of reinforcement renders superfluous the additional retaining straps which are intended to retain the air-bag cover on the instrument panel when the air-bag unfolds. A shaping of the instrument panel to increase the rigidity is not necessary since the reinforcement need only be arranged in the location in which it is necessary.

Other objects, advantages and novel features of the present invention will become apparent from the following detailed description of the invention when considered in conjunction with the accompanying drawings.

DETAILED DESCRIPTION OF THE DRAWINGS

Figure 1:
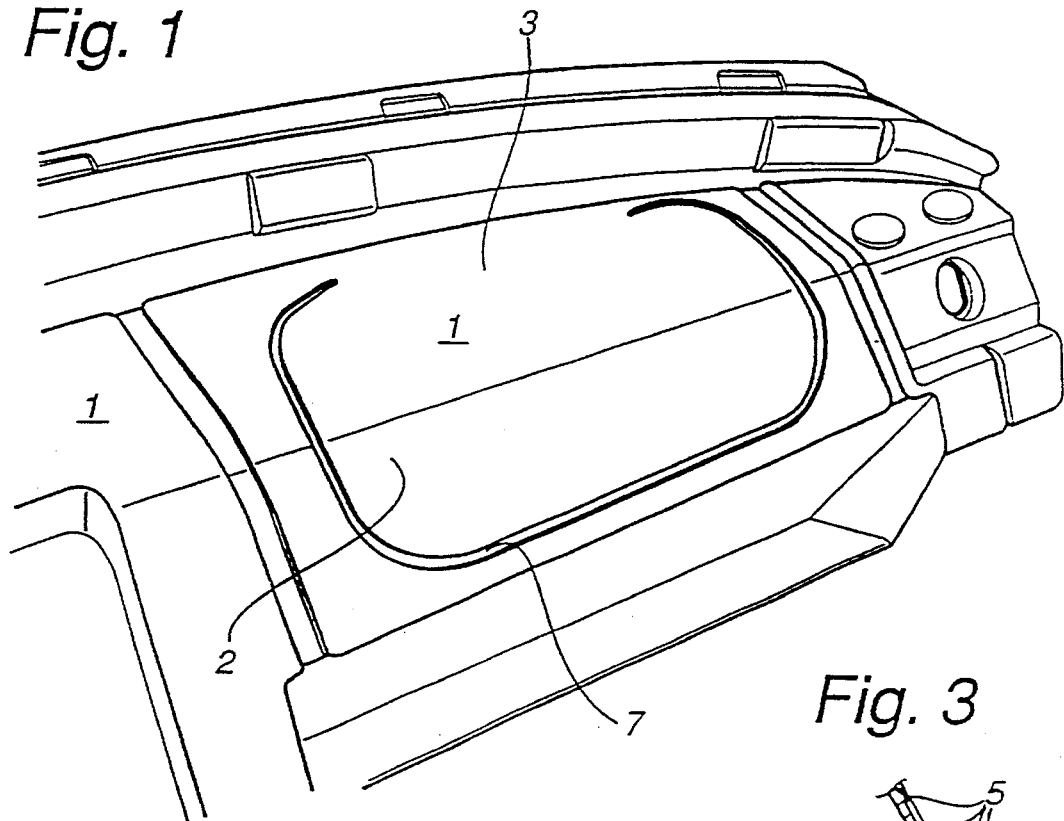
FIG. 1 schematically shows, on the passenger side a view of a stiffening-panel profile of an instrument panel with cut-out air-bag flap, constructed according to a preferred embodiment of the present invention.

FIG. 1 shows a shaped stiffening panel 1 of an instrument panel in a motor car on the passenger side, as seen from the front. After shaping, the stiffening panel 1 is covered over with foam and/or covered by a film. The stiffening panel 1 serves to maintain the shape of the instrument panel, even under loading. Integrated into the stiffening panel 1 of the instrument panel is an air-bag cover 2 which covers over, in a manner such that it can be swung open, an air-bag (not shown here) which is folded in behind said cover. The air-bag cover 2 has been separated out of the stiffening panel 1, apart from a remaining connecting section 3, whereupon the connecting section 3 forms the hinge of the air-bag cover 2, around which the air-bag cover 2 swings open during the unfolding movement of the air-bag and thus makes way for the air-bag to unfold in the direction of the vehicle interior.

Figure 3:
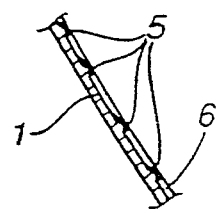
FIG. 3 shows a section along the line III—III in FIG. 2 through the stiffening panel and the pressed-on reinforcement.
Figure 2:
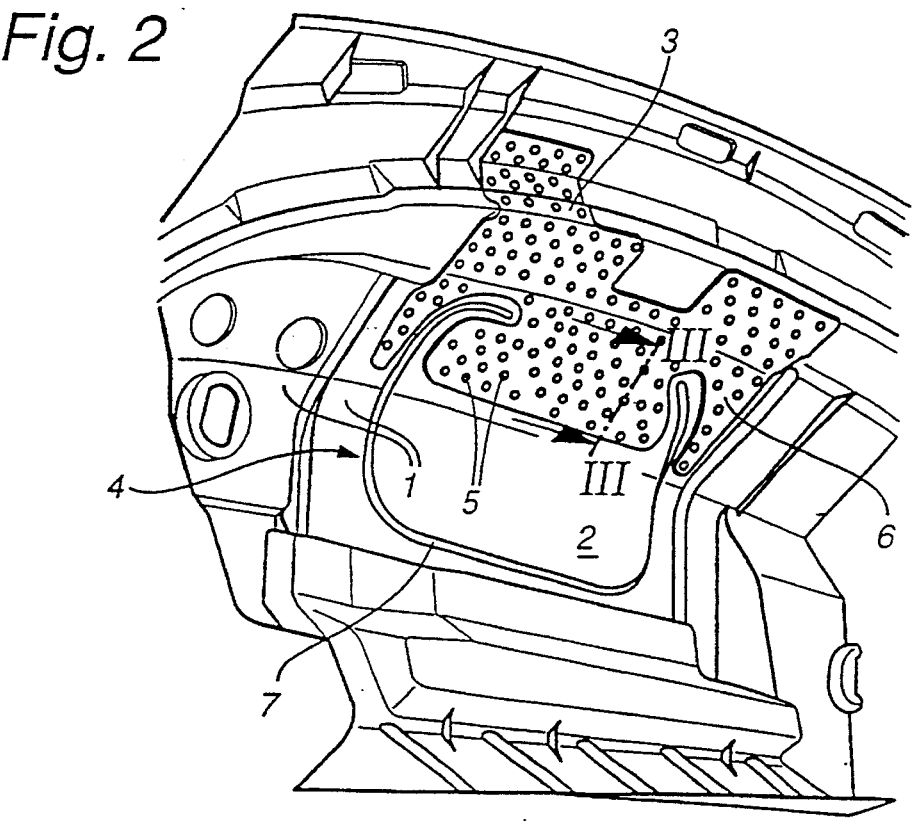
FIG. 2 shows the instrument panel of FIG. 1, as seen from the rear side, with the reinforcement visible.

In order that the air-bag cover 2 does not tear in the connecting section 3 under this loading, a mat-like reinforcement 6 which exhibits openings 5 rests, as can be seen in FIG. 2, securely against the inner side 4 of the stiffening panel 1, which reinforcement 6 increases the strength of the stiffening panel 1 in this region. The reinforcement 6 is pressed onto the inner side 4 of the stiffening panel 1, the material of the stiffening panel 1, represented in FIG. 3, being in a state, after the pressing operation, in which it has been pressed into the openings 5 of the reinforcement 6, and the reinforcement 6 consequently being connected intimately to the stiffening panel 1.

The reinforcement 6 can be pressed onto the stiffening panel 1 in a preformed state. Alternatively, in a manner which is particularly favorable in manufacturing terms, the reinforcement 6 can be simultaneously shaped and pressed together with the stiffening panel 1 during the shaping of the latter. The openings 5 may be stamped into the reinforcement material, e.g. into a metal plate, beforehand. A uniform arrangement of the openings 5 results in a uniform connection and force transmission to the stiffening panel 1 in the region of the air-bag cover 2 and in the region of the surrounding instrument-panel surface. In order to prevent further separation of the air-bag cover at the ends of the separating line 7, the reinforcement 6 extends out to both sides of the separating line 7 of the air-bag cover 2 and is taken up to the separating line 7 as is shown clearly in FIG. 2.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Motor vehicle instrument panel comprising:

a stiffening panel defining an instrument panel shape, said stiffening panel including an airbag cover section and a hinge connection section which connects the airbag cover section to adjacent stiffening panel sections, and a reinforcement mat connected to a side of said stiffening panel which faces away from a vehicle passenger space bounded by the instrument panel when in an in-use position in a vehicle, wherein said reinforcement mat includes a plurality of openings, and wherein said reinforcement mat and stiffening panel are connected together by pressing of material of the stiffening panel into the openings of the reinforcement mat thereby providing an intimate connection of the reinforcement mat and stiffening panel without requiring additional fastening material.

2. Instrument panel according to claim 1, wherein the reinforcement mat is configured to extend over both sides of a separating line between the air-bag cover section and adjacent stiffening panel sections.

3. Instrument panel according to claim 1, wherein the openings are punched in a uniform arrangement into a metal reinforcement plate which forms the reinforcement mat.

4. Instrument panel according to claim 2, wherein the openings are punched in a uniform arrangement into a metal reinforcement plate which forms the reinforcement mat.

5. Instrument panel according to claim 1, wherein the stiffening panel is shaped in the pressing operation.

6. Instrument panel according to claim 1, wherein the reinforcement mat is shaped in the pressing operation.

7. Instrument panel according to claim 5, wherein the reinforcement mat is shaped in the pressing operation.

8. Instrument panel according to claim 1, wherein said reinforcement mat consists of sheet metal.

9. Instrument panel according to claim 1, wherein the reinforcement mat consists of flat-woven material.

10. Instrument panel according to claim 1, wherein the reinforcement mat consists of a textile material insert.

11. Process of making a motor vehicle instrument panel comprising:

providing a stiffening panel defining an instrument panel shape, said stiffening panel including an airbag cover section and a hinge connection section which connects the airbag cover section to adjacent stiffening panel sections, providing a reinforcement mat with a plurality of openings, and connecting the reinforcement mat to a side of said stiffening panel which faces away from a vehicle passenger space bounded by the instrument panel when in an in-use position in a vehicle, said connecting comprising pressing of material of the stiffening panel into the openings of the reinforcement mat thereby providing an intimate connection of the reinforcement mat and stiffening panel without requiring additional fastening material.

12. Process according to claim 11, comprising shaping the stiffening panel during said pressing.

13. Process according to claim 11, comprising shaping the reinforcement mat during said pressing.

14. Process according to claim 12, comprising shaping the reinforcement mat during said pressing.

* * * * *